United States Patent [19]

Chamberlin et al.

[11] 4,163,718

[45] * Aug. 7, 1979

[54] COMPLEXING AGENTS FOR PHENOLICS

[75] Inventors: Thomas A. Chamberlin; Norman L. Madison, both of Midland, Mich.

[73] Assignee: The Dow Chemical Company, Midland, Mich.

[ * ] Notice: The portion of the term of this patent subsequent to Mar. 1, 1994, has been disclaimed.

[21] Appl. No.: 761,555

[22] Filed: Jan. 24, 1977

Related U.S. Application Data

[60] Continuation-in-part of Ser. No. 639,152, Dec. 9, 1975, Pat. No. 4,011,160, which is a division of Ser. No. 554,380, Mar. 3, 1975, Pat. No. 4,001,147.

[51] Int. Cl.[2] .......... C02B 1/20
[52] U.S. Cl. .......... 210/54
[58] Field of Search .......... 210/40, 54, 56; 260/2 R

[56] References Cited

U.S. PATENT DOCUMENTS

| | | | |
|---|---|---|---|
| 3,484,837 | 12/1969 | Odom et al. | 210/52 |
| 3,640,909 | 2/1972 | Jones et al. | 210/54 |
| 4,011,160 | 3/1977 | Chamberlin et al. | 210/40 |
| 4,011,376 | 3/1977 | Tomalia et al. | 526/11.1 |

OTHER PUBLICATIONS

Inoue et al., J. Poly. Sci., Polymer Chemistry Ed., 14, pp. 1933–1938 (1976).
Tsuchida et al., European Poly. J., 13, pp. 269–272 (1977).

*Primary Examiner*—Charles N. Hart
*Assistant Examiner*—Ivars Cintins
*Attorney, Agent, or Firm*—L. W. White; J. P. Hill

[57] ABSTRACT

Phenolics are complexed with acylated polyamines to form materials which are essentially water-insoluble. This phenomenon makes acylated polyamines particularly useful in removing phenolics from aqueous waste streams.

8 Claims, No Drawings

COMPLEXING AGENTS FOR PHENOLICS

CROSS REFERENCE TO RELATED APPLICATIONS

This is a continuation-in-part of our application Ser. No. 639,152 filed on Dec. 9, 1975, now U.S. Pat. No. 4,011,160 which in turn is a division of Ser. No. 554,380 filed Mar. 3, 1975, now U.S. Pat. No. 4,001,147. The disclosure of each of these applications is incorporated herewith by reference.

BACKGROUND OF THE INVENTION

Economic and environmental considerations necessitate the removal of phenolics from waste streams. Pollution of aqueous waste streams with phenolics (e.g., phenolic dyes, tannins, etc.) is particularly insidious from an environmental point of view due to the known toxicity and objectionable color of phenolics.

Previous methods of purifying such aqueous waste streams have generally been time consuming, difficult and/or costly. Such methods have included biological methods (activated sludges or trickling filtration), ozone treatments and/or filtration through activated carbon.

To illustrate the problems, the biological systems can only be used to remove very minor amounts of the phenol; the ozone treatment requires extremely careful monitoring to match ozone with the particular phenol(s), a value which differs between phenolics; and the activated carbon system is extremely susceptible to plugging by organic matter. Removal of phenolics from organic media is even more difficult.

Thus, there exists a need for a new method of economically and conveniently removing phenolics from waste streams.

SUMMARY OF THE INVENTION

We have discovered that acylated polyamines bearing a plurality of units corresponding to the formula

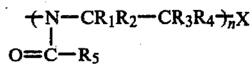

I wherein: $R_1$–$R_4$ are each independently hydrogen, lower alkyl or hydroxy-substituted lower alkyl of 1 to about 6 carbon atoms, with the proviso that at least 2 of $R_1$–$R_4$ are hydrogen (preferably $R_1$ and $R_2$ are hydrogen, methyl, ethyl or hydroxymethyl, and $R_3$ and $R_4$ are each hydrogen, most preferably $R_1$–$R_4$ are each hydrogen); $R_5$ is hydrogen, phenyl or alkyl of from 1 to about 24 carbon atoms and is preferably alkyl and is most preferably methyl or ethyl; n is an integer of at least 1; and X is a terminal inorganic or organic group (e.g., chloro, bromo, iodo, hydroxy, etc.).

DETAILED DESCRIPTION OF THE INVENTION

The acylated polyamines here used can be prepared by conventional techniques. For example, by the reaction of (a) a polyamine with (b) an acid halide, an acid anhydride, a lower alkyl ester of the desired acid, etc.

Another convenient method of preparing the acylated polyamines is by polymerizing a 2-oxazoline of the formula

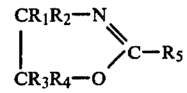

wherein $R_1$–$R_5$ are as defined above. The polymerization of 2-oxazolines normally occurs in the presence of an alkylating reagent (e.g., methyl tosylate, dimethyl sulfate, alkyl halides, benzylic halides, etc.) or acids. See Litt et al. (U.S. Pat. No. 3,483,141). The "halides" referred to above are chlorides, bromides or iodides. The choice of initiator can be varied to convenience in that the initiator residue is not the complexation site for the phenolics. The units represented by I are the complexing moieties.

From a procedural standpoint, however, the choice of initiator can be significant based upon the particular method one chooses to implement this invention. For example, in our patent applications cited above, the halogen-containing initiator was a cross-linked poly(vinylaromatic) resin bearing a plurality of ar-halomethyl groups which were particularly useful in the form of resin beads. Such initiators are solid, insoluble interpolymers which have been used extensively as the polymer matrix in ion-exchange resins. These resinous materials have been typically prepared by (1) halomethylating (e.g., chloromethylating) a cross-linked or cross-linkable poly(vinylaromatic) resin or by (2) interpolymerizing a halomethylated vinylaromatic monomer with a suitable cross-linking agent. The physical form of the reaction product of such cross-linked resinous initiators with a 2-oxazoline made it particularly suitable for use in columns, since the beads were permeable to aqueous and other waste streams containing phenol.

The initiator can also be a polymerizable vinyl monomer having a benzylic or allylic halide group which can be reacted with a 2-oxazoline and subsequently polymerized through the vinyl group(s). Examples of such initiators include vinylbenzyl chloride, 2-chloromethylbutadiene, allyl bromide, etc. This is illustrated by the disclosure in a commonly-owned copending application, Ser. No. 554,381 submitted by D. A. Tomalia et al. on Mar. 3, 1975, now U.S. Pat. No. 4,011,376. The disclosure of this application is incorporated herewith by reference. The initial reaction product or the cross-linked polymer are similarly useful in complexing phenolics.

The initiator can also be a non-polymerizable organic compound. This includes, for example, alkyl halides (e.g., methyl iodide, butyl chloride, octyl bromide, dodecyl iodide, etc.), benzylic halides (e.g., benzyl chloride, chloromethyl naphthalene, dodecyl benzyl chloride, etc.), cycloalkyl (e.g., cyclohexyl bromide, etc.), acid halides (e.g., acetyl chloride, stearoyl bromide, benzoyl chloride, etc.), and other like compounds.

The chemistry of oxazolines, including ring-opening reactions with halogen-containing initiators, has been reviewed by Seeliger et al., Angew. Chem. Internat. Edit., Vol. 5, No. 10, 875 (1966); J. A. Frump, Chemical Review, Vol. 71, No. 5, 483 (1971); Litt et al., J. Macromol. Sci. Chem., Vol. A-9 (5), 703 (1975); and the polymerization mechanism using benzyl halide initiators is discussed additionally by Saegusa et al., Makromolecular Chemie, Vol. 177, 2271 (1976).

Copolymers of 2-oxazolines are also suitable for use herein and they can be similarly prepared by warming the oxazoline reactants to a temperature sufficient to cause ring-opening of the oxazoline monomers in the presence of an initiator.

The molecular weight of the acylated polyamines can be varied. However, the higher molecular weight materials tend to be more efficient in complexing with (and thereby reducing the concentration of) phenolics in aqueous waste streams.

The terms "phenol" and "phenolics" as used herein include phenol and other aromatic hydrocarbons bearing 1 or more phenolic hydroxyl groups (e.g., resorcinol, hydroquinone, chlorophenol, p-hydroxybenzoic acid, tannic acid, phenol sulfonic acid, phenol disulfonic acid, etc.).

In the practice of the invention, the acylated polyamines are contacted with a phenol or a phenol-containing liquid. The complex between the acylated polyamine and phenol forms rapidly and normally precipitates from an aqueous medium. This represents a simple procedure then for removing phenolic contaminants from aqueous waste streams.

The complex formed by the interaction of the acylated polyamines with a phenol are believed to be new compositions of matter. Such complexes are normally amorphorus water-insoluble compositions which will disassociate to a low but measurable degree in water. This property makes the novel complexes useful as slow release agents for biocidal phenols, etc. The solubility generally varies inversely with the temperature of the water. It has also been observed that phenols bearing electron-withdrawing substituents (e.g., halo, nitro, carboxy, etc.) on the aromatic ring tend to be more stable and less soluble in water than the corresponding complexes with phenols having only hydrogen or electron-donating substituents (e.g., alkyl, alkoxy, etc.) on the aromatic ring. The complexes can be broken by treatment with base (e.g., aqueous NaOH, KOH, $Na_2CO_3$, etc.).

EXPERIMENTAL

The following experiments will further illustrate the invention.

EXPERIMENTS 1–6

Six separate aqueous solutions were prepared, each of which contain 148 parts per million (ppm) of poly(2-ethyl-2-oxazoline). Phenol was added in varying amounts to five of the solutions. Each of the solutions was thoroughly mixed and heated to approximately 70° C. at which point each of the solutions was cloudy. Each of the solutions was then permitted to cool slowly and the temperature at which the solution became clear noted. The results are summarized in Table I.

TABLE I

| Ex. | $C_6H_5$—OH (ppm) | T clearing (°C.) |
|---|---|---|
| 1 | 0 | 66.0 |
| 2 | 1000 | 61.5 |
| 3 | 2000 | 56.0 |
| 4 | 3000 | 51.0 |
| 5 | 4000 | 44.0 |
| 6 | 5000 | 35.0 |

EXPERIMENTS 7–15

In another simpler set of experiments, polyethyloxazoline having a molecular weight of 500,000 was dissolved in water at a concentration of 6,627 ppm. To this solution was added aliquots of aqueous phenol solution. After each aliquot of aqueous phenol was added, the resulting mixture was heated beyond the cloud point and subsequently cooled until the point at which the solution became clear. This temperature was recorded and the results are summarized in Table II.

Table II

| Ex. | $C_6H_5$—OH (ppm) | Poly(EtOx) (ppm) | T clearing (°C.) |
|---|---|---|---|
| 7 | 0 | 6627 | 42.4 |
| 8 | 329 | 6583 | 60.9 |
| 9 | 654 | 6540 | 59.6 |
| 10 | 975 | 5698 | 58.2 |
| 11 | 1604 | 6414 | 55.0 |
| 12 | 3108 | 6215 | 47.3 |
| 13 | 4521 | 6028 | 39.7 |
| 14 | 5851 | 5851 | 26.0 |
| 15 | 7108 | 5685 | 18.6 |

The data in Tables I and II show that the complexes of the phenol and acylated polyamine are more soluble in colder water than in the warmer water. The data in the above Tables also show that the higher molecular weight acylated polyamines are more effective at reducing the concentration of phenol in an aqueous solution to a lower value at the same temperature. Compare Experiment 2 with Experiment 8 and compare Experiment 3 with Experiment 11.

The practical implication of the above experiments is that the concentration of phenol in a phenol-contaminated stream, for example, can be reduced to the parts per million phenol listed in Tables I and II using the indicated acylated polyamines at the indicated temperatures. The concentration of phenol in those systems can be further reduced by merely increasing the temperature. By so doing the complex becomes insoluble and will separate out as a water-insoluble phase.

EXPERIMENTS 16–19

In this series of experiments, phenol, 3-methylphenol, 3-chlorophenol and 3-hydroxyphenol were added in minor amounts to individual containers having equal volumes of cyclohexane and water. The vials were thoroughly shaken until each of the phenolic materials were dissolved. The concentration of the phenol in the cyclohexane layer and the aqueous layers were determined. A minor amount of a poly(2-ethyl-2-oxazoline) was added and the contents were again thoroughly mixed by shaking. The concentration of the phenols were then again determined in the cyclohexane layers. It was observed that the concentration of each of the phenols in the cyclohexane layer was substantially reduced. The same results were achieved using poly(2-methyl-2-oxazoline) in place of the poly(2-ethyl-2-oxazoline). These oxazoline polymers were also useful in reducing the concentration of phenol from a cyclohexane solution thereof; the phenol complex with the poly(2-alkyl-2-oxazoline) and precipitated as an insoluble material.

In the cyclohexane/water/phenolic experiments, it was observed that the poly(2-alkyl-2-oxazoline) were more effective in reducing the concentration of the phenolic in the cyclohexane in those instances where the phenolic had an electron-withdrawing substituent (i.e., 3-chloro and 3-hydroxy).

The above experiments illustrate the invention but are not meant to be limiting. Other acylated polyamines and other phenolics can be similarly complexed as set forth in the body of this specification.

What is claimed is:

1. A method of complexing phenolics comprising contacting a phenol with an acylated polyamine bearing a plurality of units corresponding to the formula

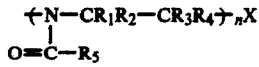

wherein: $R_1$–$R_4$ are each independently hydrogen, lower alkyl or hydroxy-substituted lower alkyl of from 1 to about 6 carbon atoms, with the proviso that at least 2 of $R_1$–$R_4$ are hydrogen; $R_5$ is hydrogen, phenyl or alkyl of from 1 to about 24 carbon atoms; n is an integer of at least 1; and X is a terminal inorganic or organic group.

2. The method of claim 1 conducted in an aqueous medium.

3. The method of claim 1 wherein said acylated polyamine is a polymer comprising ring-opened units of the monomer

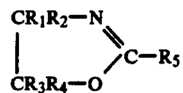

wherein $R_1$–$R_5$ have the aforesaid meaning.

4. The method defined by claim 3 wherein said acylated polyamine is poly(2-methyl-2-oxazoline) or poly(2-ethyl-2-oxazoline.

5. The method defined by claim 1 wherein $R_1$ and $R_2$ are hydrogen, methyl, ethyl or hydroxymethyl, and $R_3$ and $R_4$ are each hydrogen.

6. The method defined by claim 5 wherein $R_1$–$R_4$ are each hydrogen.

7. The method defined by claim 1 wherein $R_5$ is alkyl.

8. The method defined by claim 7 wherein $R_5$ is methyl or ethyl.

* * * * *